Figure 1:
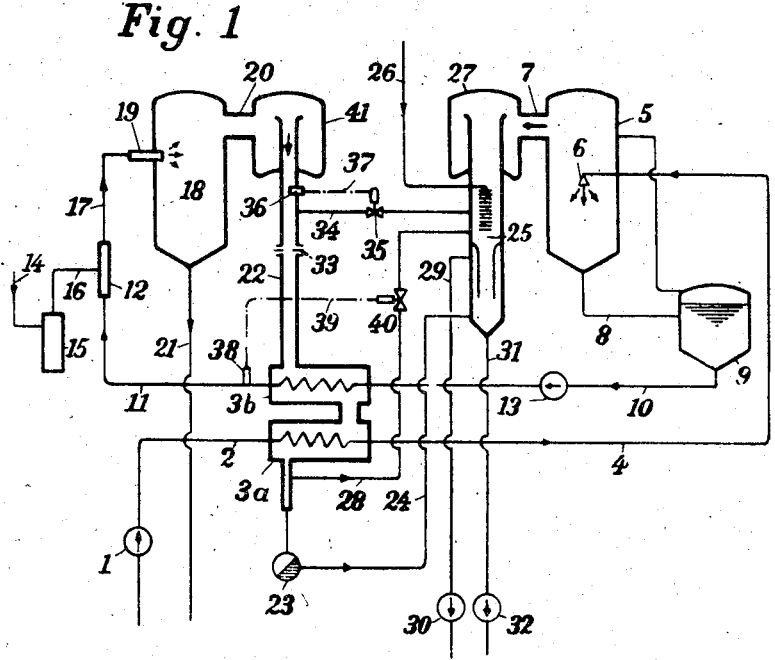

INVENTOR.
WALTER WITTWER.

United States Patent Office 2,846,320
Patented Aug. 5, 1958

2,846,320

METHOD AND APPARATUS FOR HEAT TREATING LIQUID FOODSTUFF AND BEVERAGES

Walter Wittwer, Winterthur, Switzerland, assignor to Alpura A. G., Bern, Switzerland, a corporation of Switzerland Application April 3, 1953, Serial No. 346,731

Claims priority, application Switzerland April 5, 1952

6 Claims. (Cl. 99—212)

The present invention relates to a method and an apparatus for treating liquids, particularly liquid foodstuffs and beverages, in which the liquid is continuously preheated, rapidly heated at increased pressure by means of steam, at least some of which condenses in the liquid, and in which the so heated liquid is subsequently expanded by instantaneous pressure reduction whereby an amount of water determined by the expansion pressure is removed from the liquid by vaporization. The invention relates particularly to a system in which the density or specific weight of the treated liquid is maintained at a predetermined value.

An object of the invention resides in the provision of a method for treating liquid foodstuffs in which the liquid to be treated is preheated, rapidly further heated by means of steam partly condensing in the liquid, and rapidly expanded whereby a portion of the water, which is determined by the expansion pressure, is removed from the liquid by evaporation, and in which method the expansion pressure of the liquid is maintained and the amount of steam introduced into the liquid and thereby the specific weight of the treated liquid is controlled by adjusting the heat transferred into the liquid during the preheating step.

Another object of the invention resides in the provision of an apparatus for performing the method described supra which apparatus comprises means for continuously passing the liquid to be treated through a preheater constructed as a heat exchanger, thereupon passing the liquid through a heater in which steam is introduced into the flowing liquid, and subsequently passing the liquid into an expansion chamber. The apparatus comprises means for maintaining the pressure of the liquid in the expansion chamber and means for controlling the amount of heat transferred to the liquid in the preheater.

In order to save heat at least a portion of the steam escaping during expansion of the liquid is preferably used for preheating the liquid. The apparatus according to the invention is preferably provided with a conduit connecting the steam space of the preheater with that of the expansion device, a throttling means being interposed in this conduit, and a further conduit being provided connecting the steam space of the expansion chamber with a condenser operating at lower pressure. The latter conduit may be provided with a valve which is actuated to maintain the pressure in the expansion.

The steam space of the preheater is preferably connected with the condenser by means of a conduit in which the control means for adjusting the amount of heat transferred in the preheater are arranged, the control means comprising a regulating valve for adjusting the steam pressure in the preheater. The regulating valve is actuated by means of a device which responds to the temperature of the liquid flowing from the preheater and operates the valve for maintaining a predetermined preheat temperature.

In a modified embodiment of the invention the regulating valve for controlling the heating steam passing through the preheater is connected with a device which actuates the regulating valve according to the specific weight of the treated liquid.

Figure 2:
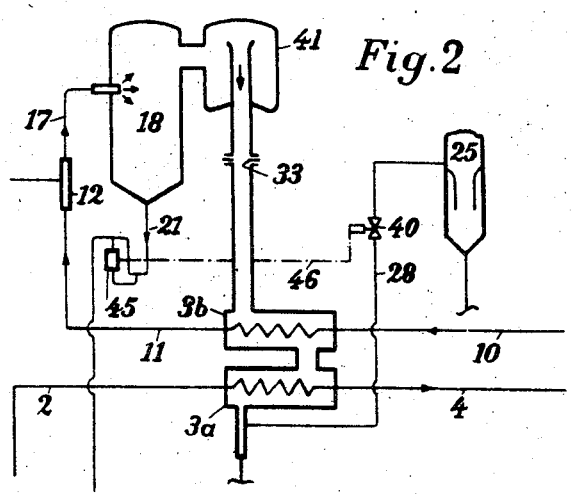

The novel features which I consider characteristic of my invention are set forth with particularity in the appended claims. The invention itself, however, and additional objects and advantages thereof will best be understood from the following description of two embodiments thereof when read in connection with the accompanying drawing in which Fig. 1 is a diagrammatic illustration of a plant according to the invention for treating raw milk;

Fig. 2 is a diagrammatic illustration of a modified portion of the plant shown in Fig. 1.

Like parts are designated by like numerals in both figures of the drawing.

The milk to be treated is pumped from a storage container, not shown, by a pump 1 through a conduit 2 into a preheater 3a and flows in preheated condition through conduit 4 into a deaerator 5. A subatmospheric pressure is maintained in the latter. The milk is finely divided by pressure reduction in a nozzle 6 whereby the temperature of the milk is reduced and a part of the water contained in the milk is evaporated and removed through a conduit 7 in the form of steam.

The milk which now contains a greater percentage of dry substance collects at the bottom of the deaerator container 5 and is conducted into a container 9 through a conduit 8. The treatment is for the purpose of expelling air and gases contained in the milk. Volatile components, which impair the taste of the milk, are eliminated by the part-evaporation of the water contained in the milk.

The milk subsequently flows through conduit 10 to the preheater 3b and reaches a heating device 12 through a conduit 11. A pressure pump 13 is interposed in conduit 10 which increases the pressure of the milk. The milk leaving the preheater 3b has an increased temperature which, however, is below the boiling point at atmospheric pressure.

The heating device 12 serves for pasteurization of the milk. This is effected by rapid heating with steam introduced in the milk. The steam is supplied from a steam producer, not shown, through a conduit 14 and a water separator 15 from which it is conducted to the heating device through a conduit 16. By heating the milk to a temperature above 140° C., for example to 160° C., during a fraction of a second, all bacterias and spores are killed. The conditions in the heating device are so that the introduced steam is condensed in the milk. This increases the water content of the milk. The amount of water absorbed by the milk depends on the preheat temperature of the milk and on the temperature of the milk leaving the heating device 12.

To prevent undesired changes in the milk by the high temperatures, the milk is cooled immediately after heating. This is effected by a rapid reduction of the pressure in an expansion device 18 which is connected with the heater 12 by a conduit 17. A suitable homogenizing device 19 is preferably provided at the inlet of the device 18. The latter is constructed as a closed container in which a subatmospheric pressure is maintained. The sudden pressure reduction effects elimination of an amount of water in steam form which amount depends on the pressure reduction, the steam being removed through conduit 20.

The milk, which is cooled to a temperature below the atmospheric boiling point, is removed from the plant through conduit 21 and may be conducted to a conventional plate cooler, not shown.

The steam escaping through conduit 20 is received in a steam trap 41 and subsequently flows through conduit 22 into the preheaters 3b and 3a which are constructed as heat exchangers and in which a portion of the heat contained in the steam is transferred to the milk flowing through the preheaters. The condensate formed thereby collects in a separator 23 and is conducted through a conduit 24 into a condenser 25. The latter is constructed as a jet condenser into which fresh water is injected from conduit 26.

A droplet separator 27 is arranged above the main condenser 25, the steam space of the separator being connected with the deaerator 5 by a conduit 7. The steam spaces of the preheaters 3a and 3b are connected with the interior of the condenser through a conduit 28. For producing a suitable suction pressure within the containers 5 and 18, the condenser 25 is connected through conduit 29 with an air pump 30. The mixture of injection water and condensate is removed through conduit 31 from the condenser by means of a condensate pump 32.

In the aforedescribed plant the water content of the milk is changed several times. A certain amount of water is extracted in the deaerator. The water content is increased in the heating device due to condensation of heating steam, and a portion of the water contained in the milk is removed as steam in the pressure reducing device. Processed milk intended to be sold to the public must have the same concentration, i. e. the same proportion between water content and dry substance, after the treatment, as the raw milk. The problem is solved by the method and apparatus according to the invention which assures at the same time improved heat economy.

The apparatus is operated according to the invention in such manner that the specific weight of the treated liquid, at constant final pressure, is controlled by regulating the preheat temperature through adjustment of the heat transferred to the milk flowing through the preheater. The preheat temperature constitutes a measure for the amount of water absorbed by the milk through condensation of the heating steam. A higher preheat temperature, i. e. a temperature which is closer to the boiling point effects a smaller water reception at constant expansion pressure than a lower preheat temperature.

In the illustrated embodiment of the invention the steam space of preheater 3a is connected with the steam space of the condenser by conduit 28. A throttling device 33 in the form of an orifice plate is provided in conduit 22 so that, during normal operation, the pressure upstream of the orifice plate, with regard to the direction of the steam flow, is higher than the pressure in the steam space of the preheater.

A further conduit 34 leading to condenser 25 is connected with conduit 22 between the droplet separator 41 and the orifice plate 33. In conduit 34 a valve 35 is arranged which is actuated by a servomotor which is connected by a pulse conducting conduit 37 with a pressure sensitive device 36. The servomechanism is so constructed that the valve is opened at increasing expansion pressure and is closed at decreasing expansion pressure. The mechanism comprising elements 34, 35, 36, and 37 maintains the expansion pressure of the milk at a constant value.

The specific weight of the treated milk is controlled according to the invention by controlling the preheat temperature. To accomplish this a temperature sensitive device 38 is arranged in conduit 11 adjacent to the preheater 3b. A pulse conduit 39 transmits the regulating pulse to a servomotor which actuates valve 40 in conduit 28. In the illustrated arrangement the preheat temperature is thermostatically controlled and can be maintained at a predetermined value.

If the temperature of the milk flowing from the preheater exceeds the predetermined value, the water content of the treated milk is unduly reduced. To prevent this, valve 40 in conduit 28 is opened, causing a pressure reduction in the steam space of the preheater and also ahead of the orifice plate 33. This pressure reduction immediately causes closing of valve 35 so that dropping of the expansion pressure is prevented.

Due to the pressure reduction in the steam space of the preheater the saturation temperature of the steam is reduced which results in a reduction of the amount of heat transferred to the milk. The preheat temperature of the milk is thus brought down to the predetermined value at which the water reception of the milk during heating by steam introduced thereinto is adjusted according to the desired specific weight of the treated milk.

The water content of the treated milk increases at a decrease of the preheat temperature below the predetermined value at constant expansion pressure, because of condensation in the milk of a greater amount of the steam introduced in the heating device. At this operating condition, the temperature sensitive device 38 effects closing of the valve 40 so that a greater amount of heat is transferred to the milk in the preheaters 3a and 3b, effecting the predetermined preheat temperature and the desired specific weight of the treated milk.

The preheat temperature which is required to effect a desired water content of the treated milk can be calculated or may be ascertained by tests. When treating raw milk for sale to the public, the preheat temperature is so adjusted that the proportion of dry substance in the treated milk corresponds exactly to the proportion in the milk before it is treated. This assures that the consumer receives milk whose taste is at least as good as that of the raw milk and which is completely pasteurized in the heating device 12.

The flow area of the orifice plate 33 is so chosen that the reduction of the saturation temperature of the steam caused by throttling effects reduction of the preheat temperature of the milk so far below the temperature of the expanded milk in the container 18, that the increased water reception during heating substatnially equals the reduction of the water content in the deaerator 5. The orifice plate 33 affords an approximate adjustment of the specific weight of the milk. Correct adjustment is afforded by the control of valve 40 in the conduit 28.

As a modification, the orifice plate 33 may be replaced by a valve actuated by the temperature sensitive device 38, and the valve 40 in conduit 28 may be omitted. The cost of such a regulating valve, however, would be considerably greater than that of valve 40 which regulates a much smaller amount of steam.

The temperature sensitive device 38 may be replaced by a different device for actuating valve 40. Fig. 2 illustrates an arrangement in which a density regulator 45 produces pulses in accordance with changes of the specific weight of the milk which pulses are transmitted through conduit 46 to the valve 40. The mechanism is, for example, so constructed that an increase of the specific weight above a predetermined value effects closing of the valve 40 in the conduit 28. This increases the amount of heat transferred in the preheaters, raising the preheat temperature and consequently lowering the water content of the treated liquid.

The invention is not limited to the treatment of milk; the method and apparatus are also suitable for treating other liquids, for example fruit juices or other liquid foodstuffs, which are sterilized, for example, by direct contact with steam. The invention affords accurate control of the concentration of the liquids also in these cases.

The method and apparatus according to the invention can also be used for treating liquids whose water content must be changed to a predetermined degree. The control of the preheat temperature affords adjustment of the specific weight of the liquids within certain limits.

While I have shown and described specific embodiments of my invention, it will be apparent to those skilled in the art that various changes, modifications, substitutions, additions and omissions may be made therein without departing from the spirit and scope of my invention as set forth in the appended claims.

What I claim as my invention is:

1. In the method of heat treating liquid foodstuff and beverages in which the liquid to be treated is mixed with live steam, the liquid-steam mixture is expanded whereby steam is separated from the mixture and the liquid from which steam has been separated by expansion is removed as the useful product, the steps of diverting a controlled portion of the steam separated from the liquid-steam mixture into a zone in which the pressure is lower than the pressure of the expanded liquid-steam mixture, for controlling the expansion pressure of the liquid-steam mixture, and of indirectly transferring heat from the steam remaining after said diversion to the liquid to be treated for preheating the liquid prior to the mixing of the liquid with live steam.

2. A method as defined in claim 1 in which the amount of steam from which heat is indirectly transferred to the liquid to be treated is controlled in accordance with the temperature of the preheated liquid.

3. A method as defined in claim 1 in which the amount of steam from which heat is indirectly transferred to the liquid to be treated is controlled in accordance with the specific weight of the useful product.

4. A system for heat treating liquid foodstuff and beverages comprising, in combination, a heating device for heating the liquid to be treated by mixing live steam with the liquid, an expansion chamber connected with said heating device to receive the liquid-steam mixture from said heating device and to allow expansion of the liquid-steam mixture for separating steam therefrom, means connected with said expansion chamber for removing the treated liquid as the final product from said expansion chamber, a steam condenser, a steam conduit connected with said expansion chamber for removing the separated steam from said chamber, a steam pipe branching from said conduit and being connected with said condenser for diverting steam from said conduit into said condenser, pressure responsive means connected with said steam conduit and being responsive to the pressure in said chamber, a valve interposed in said steam pipe and connected with said pressure responsive means to be actuated thereby for maintaining a predetermined pressure in said expansion chamber, an indirect heat exchanger for heating the liquid to be treated, a pipe for the liquid to be treated connecting said heat exchanger with said heating device for supplying preheated liquid to said heating device, means for forcing the liquid to be treated through said heat exchanger and into said heating device, said heat exchanger being interposed in said steam conduit downstream of the connection of said steam pipe with said steam conduit for receiving heating steam from said steam conduit, control means responsive to the temperature of the preheated liquid leaving said preheater and connected with said pipe for the liquid to be treated, and a valve interposed in said steam conduit downstream of the point where said steam pipe branches from said conduit, said valve being connected with said control means for opening said valve when the temperature of the liquid leaving said preheater rises above a predetermined value.

5. A system for heat treating liquid foodstuff and beverages comprising a preheater of the indirect heat exchange type for the liquid to be treated and having an outlet for said liquid, a heating device connected for liquid flow with said outlet for receiving preheated liquid from said preheater, means for forcing the liquid to be treated consecutively through said preheater and through said heating device, the latter including means for introducing steam into the liquid to be treated, an expansion chamber connected with said heating device for receiving the steam-liquid mixture therefrom and for releasing steam from the mixture, said preheater having a steam space, a conduit connecting said steam space with said expansion chamber for conducting heating steam from said expansion chamber into said steam space, a throttling device in said conduit, a steam condenser in which the pressure is lower than that in said expansion chamber, a pipe connecting said condenser with said conduit for conducting steam from the latter to the former, a valve in said pipe, pressure responsive means connected with said conduit and being responsive to the pressure in the latter and being connected with said valve for actuating the latter according to the pressure in said conduit to maintain a predetermined pressure in said conduit and in said expansion chamber, a conduit connecting the steam space of said preheater with said condenser for conducting heating steam into said condenser, a regulating valve in said last mentioned conduit, means connected with said outlet and responsive to the temperature of the preheated liquid flowing from said preheater to said heating device and connected with said regulating valve for opening the latter when the temperature of the preheated liquid rises above a predetermined value, and means for removing the treated liquid as the useful product from said expansion chamber.

6. A system for heat treating liquid foodstuff and beverages comprising, in combination, a preheater of the indirect heat exchange type for the liquid to be treated, a heating device connected for liquid flow with said preheater for receiving preheated liquid therefrom, means for forcing the liquid to be treated consecutively through said preheater and through said heating device, said heating device including means for introducing steam into the liquid to be treated, an expansion chamber connected with said heating device for receiving the steam-liquid mixture therefrom and for releasing steam from the mixture, a steam conduit connected with said expansion chamber for receiving steam from said expansion chamber, said preheater being interposed in said steam conduit for receiving heating steam therefrom, a steam condenser, an outlet conduit for the heating steam connected with said steam conduit and with said condenser, a discharge conduit for the treated liquid, which is the final product, connected with said expansion chamber, a device which is sensitive to the density of the treated liquid interposed in said discharge conduit, and a valve in said outlet conduit for the heating steam, said valve being connected with said density sensitive device for opening said valve when the density of the treated liquid falls below a predetermined value.

References Cited in the file of this patent

UNITED STATES PATENTS

| | | |
|---|---|---|
| 2,516,099 | Board et al. | July 25, 1950 |
| 2,522,796 | Olson et al. | Sept. 19, 1950 |
| 2,631,105 | Henszey | Mar. 10, 1953 |
| 2,644,758 | Cross | July 7, 1953 |